June 21, 1932.　　　E. J. TE PAS　　　1,864,380
SAFETY RELIEF VALVE
Filed July 1, 1926
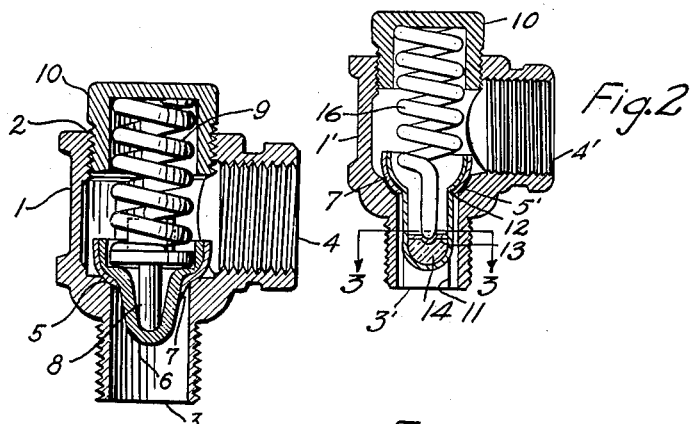
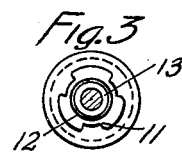
Fig. 3
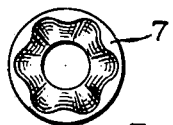
Fig. 4
Fig. 6
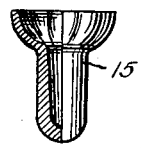
Fig. 5　　Fig. 7
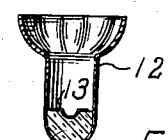
Fig. 8
INVENTOR.
Edmund J. Te Pas Patented June 21, 1932

1,864,380

UNITED STATES PATENT OFFICE

EDMUND J. TE PAS, OF LAKEWOOD, OHIO, ASSIGNOR TO THE CLEVELAND HEATER COMPANY, OF CLEVELAND, OHIO, A CORPORATION OF OHIO

SAFETY RELIEF VALVE

Application filed July 1, 1926. Serial No. 119,823.

This invention relates to safety devices to be used in connection with gas or liquid containers for the purpose of preventing explosions due to excessive pressures or heat. While not limited to such use, this invention is particularly adapted and designed for use as a pressure relief device for containers of steam or hot water.

This invention has for its general object the provision of a temperature and a pressure responsive relief device for fluid containers that is simple and inexpensive in construction, of small size and light weight, having a minimum number of parts and providing a high factor of safety in the service for which it is intended.

Another object of this invention is to provide a valve of the character described in which pressed metal parts may be used to a great extent.

A further object of the invention is to provide a relief valve whose operation is not affected by corrosion of its parts or deposition of matter from the fluid with which it is in contact.

A further object of the invention is to provide a relief valve with control means responsive to pressure and an independent control means responsive to temperature.

With the foregoing and other objects in view hereinafter stated, the invention consists in the provision of a novel, simple and effective safety device.

In the description of the invention herein, reference is to be had to the accompanying drawing which forms a part of this specification.

Figure 1 is a central vertical section of a device embodying the invention.

Figure 2 is a sectional view similar to Fig. 1 showing a modified form of valve.

Fig. 3 is a section taken on line III—III of Fig. 2.

Fig. 4 is a plan view of the valve head facing washer.

Fig. 5 is a side elevational view partly in section of the washer shown in Fig. 4.

Fig. 6 is a plan view of a modified form of valve head.

Fig. 7 is a side elevational view partly in section of the valve head shown in Fig. 6.

Fig. 8 is a sectional view of a modified form of valve head.

As illustrated in the drawing the device includes a valve casing 1 which may be of any suitable design or construction preferably cast in a single piece and provided with an internally threaded bore 2 for the reception of the spring adjusting closure cap 10. An internally threaded outlet 4 and an externally threaded inlet 3 are provided in the valve casing. A valve seat 5 of spherical contour is formed in the valve casing 1 at the inner end of the inlet passage 3. Coacting with the valve seat 5 is a two-piece valve head comprising, in the preferred form, a stamped metal body portion 6 with a flared upper end and having a series of indentations formed thereon and a replaceable fusible stamped metal washer 7 adapted to fit over the flared end of the body portion of the valve head to fill the indentations formed thereon and to provide a smooth seating face of spherical contour for the valve head. The washer 7 is adapted to fit the modified forms of valve heads 15 and 12 as well as the head 6 shown in Figure 1 and is preferably made of a softer material than the valve seat to take care of irregularities in the machining of the valve seat and insure fluid tight contact therewith. In the present instance it is advisable, for reasons hereinafter stated, to form the washer 7 from a material of low tensile strength. It may be advisable in some cases to use a non-metallic washer. The selection of the material from which to form the valve head washer depends upon the service for which the valve is intended. A wide variety of suitable materials having different physical properties are shown in The Hand Book of Chemistry & Physics, published by Chemical Rubber Publishing Co., Cleveland, Ohio, 10th edition, page 496. The assembled valve head is normally held in contact with its seat by means of the spring 9 which presses the lower portion of the valve head. Due to the spherical shape of the contacting portions of the valve head and valve seat and the location of the point of contact between the spring seat 8 and the valve head, a fluid tight contact is possible even though the line of thrust of the valve spring varies from the perpendicular. A pressed metal cap 10 provides an adjustable abutment and guide for the valve spring and also serves as a closure for the top of the valve casing.

Figs. 2 and 3 show a valve casing 1' similar to the casing 1 and differing therefrom in that it is provided with integrally formed valve head guides 11.

Figs. 7 and 8 show valve head bodies 15 and 12 respectively, adapted to be used in the valve casing 1'. The valve head bodies are shown in Figures 7 and 8 with the washer 7 removed. The washer 7 is adapted to be used on any of the valve heads shown.

The modified form of valve head 12 illustrated by Figure 8 presents an exterior surface of similar contour to the head 15 differing therefrom in that it is stamped from a lighter gauge of metal sheet. By constructing the valve head in the manner illustrated, a yielding deformable valve head is provided which is flexible enough to adapt itself to any ordinary irregularities of the washer 7 or seat 5 and by reason of the corrugations in the skirted portion and the general design of the valve head sufficient strength is provided to take care of the working stresses to which the head is subjected. The interior of the valve head is partially filled with a material 14 of a relatively low melting point such as used in the washer 7. A hard metal disc 13 having a central depression is provided to take the thrust of the valve spring. The diameter of the disc 13 is smaller than the inner diameter of the cylindrical portion of the valve head 12. Softening of the material 14 due to heat allows the valve spring to lengthen by pushing the disc 13 to the bottom of the valve head 12 through the fusible metal 14 which escapes from below the disc 13 by way of the annular space between the outer edge of the disc and the inner wall of the valve head. The thrust of the valve spring on the valve head is materially reduced by this action and a much smaller pressure will open the valve when it is in this condition.

Fig. 2 shows a modified form of valve spring 16 with its lower end formed coincident with the axis of the spring. The lower end of the spring 16 is adapted to take the place of the abutment 8 shown in Figure 1. The upper end of the spring 16 is ground to a flat surface perpendicular to the axis of the spring.

The device is installed for operation on a tank or other container so that the inlet passage 3 is subjected to the heat and pressure of a fluid confined in the tank. Should the pressure of the fluid rise above the value determined by the size and adjustment of the valve parts, the valve head is raised from its seat and the pressure relieved. When the temperature of the confined fluid becomes high enough to melt the fusible and replaceable washer 7, the washer melts and is blown or drops out of the corrugations in the valve head whereupon a series of openings around the valve seat are provided through which the contents of the tank may freely escape. As an added precaution and feature of safety, the fusible plug or abutment 14, shown in Fig. 8 may be used in connection with any of the valve heads shown. This plug is formed of a material adapted to soften and fuse at a relatively low predetermined temperature as compared with the remainder of the valve structure to effect or permit the operation of the valve head. Cementation or sticking of the valve head facing washer to its seat or to the valve head body due to corrosion or deposition of foreign matter thereon does not cause a dangerous condition in this valve. The low tensile strength of the washer 7 will permit the valve head body 6 to tear away from the washer 7 at pressures only slightly in excess of the blow-off pressure at which the valve is set to operate.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A temperature and pressure responsive relief valve, comprising a valve casing provided with fluid inlet and outlet passageways, a valve seat formed in said passageways, a valve head of pressed metal construction having indentations formed about its seating face, a washer made of a material of lower melting point than the metal of the valve head and associated therewith to fill said indentations and to provide a temperature responsive seating face for the valve head, resilient means in contact with said valve head at a point below its seating face to urge the valve head against said seat, and adjustable means to regulate the thrust of said resilient means.

2. In a valve, a valve head having a flared end with alternately raised and lowered portions, and a pressed metal washer associated therewith having an inner surface corresponding in configuration to the outer surface of the flared end of the valve head and having an annular spherical outer surface to provide a seating face for said valve head.

3. In a temperature and pressure responsive relief valve, a valve casing, a valve seat formed therein, a valve head coacting with said seat to control the flow of fluid therethrough, resilient means urging said valve head against said seat, a relatively fusible plug in said valve head to transmit the thrust of said resilient means to the valve head under normal operating conditions and to relieve the valve head of the thrust of said resilient means when said plug reaches a predetermined high temperature, and a bearing member interposed between said resilient means and said plug for the purpose of distributing the thrust of said resilient means over a large area of said plug to prevent premature yielding thereof except under abnormal temperature conditions.

4. In a temperature and pressure responsive relief valve, a valve casing having a valve seat formed therein and provided with inlet and outlet passageways, a valve head coacting with said valve seat to control the flow of fluid between said passageways, resilient loading means for said valve head, a bearing plate in said valve head adapted for contact engagement with said loading means, and relatively fusible means carried by said valve head to take the thrust of said loading means.

5. In a temperature and pressure responsive relief valve, a valve casing having inlet and outlet passageways, a valve seat in said casing, a valve head coacting with said valve seat to control the flow of fluid between said passageways, manually adjustable resilient loading means for said valve head, a bearing plate in said valve head engaged by said resilient loading means, and relatively fusible means in said valve head to take the thrust of said loading means.

6. In a temperature and pressure responsive relief valve, a valve body having inlet and outlet passageways and a valve port located therebetween, a valve head having a relatively fusible seating face cooperating with said valve port, resilient loading means for said valve head, and temperature responsive means to vary the load imposed on said valve head.

7. In a temperature and pressure responsive relief valve, a valve body having inlet and outlet passageways and a valve port located therebetween, a valve head cooperating with said valve port to control fluid flow therethrough, loading means for said valve head, abutments for said loading means one of which is manually adjustable and the other of which is carried by said valve head and fusible at predetermined temperatures to permit the opening of the valve, and a bearing member interposed between said loading means and said fusible abutment for the purpose of distributing the load of said loading means over a large area of said fusible abutment.

8. In a valve, a valve head having a flared end with alternately raised and lowered portions, and a fusible washer associated therewith having an inner surface corresponding in configuration to the outer surface of the flared end of the valve head and having an annular spherical outer surface to provide a seating face for said valve head.

9. In a temperature and pressure responsive relief valve, a valve body having inlet and outlet passageways, a valve seat defining a valve port between said passageways, a valve head having an irregularly formed face providing under predetermined conditions a non-sealing contact between said head and seat, a relatively fusible and replaceable washer associated with said valve head and normally providing for the fluid tight sealing of the valve port by said valve head, a relatively fusible abutment in said valve head, a valve spring engaging said abutment, and means to adjust the tension of said valve spring.

10. A temperature controlled relief valve for use in connection with water heating systems comprising, a valve body with inlet and outlet passageways formed therein and having a valve port therebetween, a pressed metal valve member of relatively light mass as compared with the remainder of the valve structure cooperating with the port of said body to control the flow of fluid therethrough, and a fusible element for controlling the operation of said member positioned in the outlet passageway of said valve body and in contact with said valve member.

11. In the temperature responsive relief valve, a valve body having inlet and outlet passageways and a valve port therebetween, a valve head having a relatively fusible seating face cooperating with said valve port, resilient loading means for said valve head, and fusible means responsive to abnormal temperature conditions to vary the load imposed upon said valve head.

12. In the temperature and pressure responsive relief valve, a valve body having inlet and outlet passages and a valve port therebetween, a valve head having a relatively fusible seating face cooperating with said valve port, resilient loading means for said valve head, and a fusible abutment for said loading means in said valve head responsive to abnormal temperature conditions to vary the load imposed upon said valve head.

In testimony whereof I affix my signature.
EDMUND J. TE PAS.